(12) United States Patent
Hong

(10) Patent No.: US 12,105,934 B2
(45) Date of Patent: Oct. 1, 2024

(54) ELECTRONIC APPARATUS AND UI PROVIDING METHOD THEREOF

(71) Applicant: SAMSUNG ELECTRONICS CO., LTD., Suwon-si (KR)

(72) Inventor: Junpyo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/236,769

(22) Filed: Aug. 22, 2023

(65) Prior Publication Data

US 2024/0143130 A1 May 2, 2024

Related U.S. Application Data

(63) Continuation of application No. PCT/KR2023/010618, filed on Jul. 21, 2023.

(30) Foreign Application Priority Data

Oct. 28, 2022 (KR) .................. 10-2022-0141297

(51) Int. Cl.
*G06F 3/0482* (2013.01)
*G06F 3/04845* (2022.01)
*G09G 3/22* (2006.01)

(52) U.S. Cl.
CPC ........ *G06F 3/0482* (2013.01); *G06F 3/04845* (2013.01); *G09G 3/22* (2013.01); *G09G 2320/0626* (2013.01)

(58) Field of Classification Search
None
See application file for complete search history.

(56) References Cited

U.S. PATENT DOCUMENTS

| 7,155,675 B2 | 12/2006 | Billmaier et al. |
| 7,703,115 B2 | 4/2010 | Stauton-Lambert et al. |

(Continued)

FOREIGN PATENT DOCUMENTS

| JP | 2000-89881 A | 3/2000 |
| JP | 2006-340356 A | 12/2006 |

(Continued)

OTHER PUBLICATIONS

International Search Report dated Nov. 3, 2023, issued by the International Searching Authority in International Application No. PCT/KR2023/010618 (PCT/ISA/210).

(Continued)

*Primary Examiner* — Toan H Vu
(74) *Attorney, Agent, or Firm* — Sughrue Mion, PLLC

(57) ABSTRACT

An electronic apparatus including a display; a memory configured to store at least one instruction; and at least one processor connected to the display and the memory, and configured to execute the at least one instruction to: control the display to display a user interface (UI) screen including a plurality of graphical user interface (GUI) items and a focus indicator positioned on a focused GUI item from among the plurality of GUI items; control the display to provide UI feedback on the focus indicator based on a user input to the UI screen being not identified for greater than or equal to a critical time period; and control the display to stepwise change the UI feedback on the focus indicator as a time in which the user input is not identified continues.

20 Claims, 18 Drawing Sheets

(56) References Cited

U.S. PATENT DOCUMENTS

| | | |
|---|---|---|
| 8,032,908 B2 | 10/2011 | Staunton-Lambert et al. |
| 10,067,633 B2 | 9/2018 | Kim et al. |
| 10,379,698 B2 | 8/2019 | Kim et al. |
| 10,671,253 B2* | 6/2020 | Einaudi ............... G06F 3/04842 |
| 10,798,461 B2 | 10/2020 | Luo et al. |
| 11,079,995 B1* | 8/2021 | Hulbert ................. G06F 3/0485 |
| 11,743,548 B1* | 8/2023 | Gupta .............. H04N 21/43615 |
| | | 725/59 |
| 11,768,882 B2* | 9/2023 | Desmond ................ G06F 16/51 |
| | | 707/722 |
| 2006/0271962 A1 | 11/2006 | Staunton-Lambert et al. |
| 2010/0146549 A1 | 6/2010 | Staunton-Lambert et al. |
| 2012/0260291 A1* | 10/2012 | Wood ................... H04N 21/482 |
| | | 725/45 |
| 2013/0055119 A1* | 2/2013 | Luong ................... H04N 23/62 |
| | | 715/764 |
| 2013/0086610 A1 | 4/2013 | Brockmann |
| 2013/0222283 A1* | 8/2013 | Yun ...................... G06F 3/0486 |
| | | 345/173 |
| 2017/0083204 A1 | 3/2017 | Kim et al. |
| 2017/0220228 A1* | 8/2017 | Sang ..................... H04N 23/63 |
| 2018/0348984 A1 | 12/2018 | Kim et al. |
| 2022/0334669 A1* | 10/2022 | Sanders ................ G06F 3/0482 |
| 2022/0374085 A1* | 11/2022 | Nguyen ................ G06F 1/1694 |

FOREIGN PATENT DOCUMENTS

| | | |
|---|---|---|
| JP | 2007-66081 A | 3/2007 |
| JP | 2008-90454 A | 4/2008 |
| JP | 2019-161638 A | 9/2019 |
| KR | 10-2010-0086573 A | 8/2010 |
| KR | 10-2013-0113925 A | 10/2013 |
| KR | 10-2354328 B1 | 1/2022 |
| KR | 10-2417257 B1 | 7/2022 |

OTHER PUBLICATIONS

Written Opinion dated Nov. 3, 2023, issued by the International Searching Authority in International Application No. PCT/KR2023/010618 (PCT/ISA/237).

* cited by examiner

ELECTRONIC APPARATUS AND UI PROVIDING METHOD THEREOF

CROSS-REFERENCE TO RELATED APPLICATIONS

This application is a continuation of International Application No. PCT/KR2023/010618 designating the United States, filed on Jul. 21, 2023, in the Korean Intellectual Property Receiving Office and claiming priority to Korean Patent Application No. 10-2022-0141297, filed on Oct. 28, 2022, in the Korean Intellectual Property Office, the disclosures of each of which are incorporated by reference herein in their entireties.

BACKGROUND

1. Field

The disclosure relates to an electronic apparatus and a method for providing user interface (UI) for the electronic apparatus, and more particularly, to an electronic apparatus which controls a UI screen for navigating a graphical user interface (GUI) item by using a focus indicator, and a method for providing the UI screen for the electronic apparatus.

2. Description of Related Art

Various types of electronic apparatuses have been developed in accordance with the development of electronic technology. In particular, a display device such as a television (TV) may provide a variety of contents to meet needs of a user who wants newer and more diverse functions.

As types of content provided on the TV diversify and the amount of content has increased, the importance of a navigation function for searching for a content desired by the user has also increased.

SUMMARY

Provided are an electronic apparatus which controls a UI screen for navigating a graphical user interface (GUI) item by using a focus indicator, and a method for providing the UI screen for the electronic apparatus.

Additional aspects will be set forth in part in the description which follows and, in part, will be apparent from the description, or may be learned by practice of the presented embodiments.

In accordance with an aspect of the disclosure, an electronic apparatus includes a display; a memory configured to store at least one instruction; and at least one processor connected to the display and the memory, and configured to execute the at least one instruction to: control the display to display a user interface (UI) screen including a plurality of graphical user interface (GUI) items and a focus indicator positioned on a focused GUI item from among the plurality of GUI items; control the display to provide UI feedback on the focus indicator based on a user input to the UI screen being not identified for greater than or equal to a critical time period; and control the display to stepwise change the UI feedback on the focus indicator as a time in which the user input is not identified continues.

The at least one processor may be further configured to control the display to change the UI feedback on the focus indicator by stepwise overlapping and providing individual UI feedback on the focus indicator as the time in which the user input is not identified continues.

The individual UI feedback may include the UI feedback on the focus indicator, UI feedback on an adjacent region which is adjacent to the focused GUI item, and UI feedback on a remaining region other than a region including the focused GUI item and the adjacent region.

The at least one processor may be further configured to: provide a first UI feedback on the focus indicator based on the user input to the UI screen being not identified for greater than or equal to a first critical time period, overlap and provide the first UI feedback and a second UI feedback on the focus indicator based on the user input to the UI screen being not identified for greater than or equal to a second critical time period, and overlap and provide the first UI feedback, the second UI feedback, and a third UI feedback on the focus indicator based on the user input to the UI screen being not identified for greater than or equal to a third critical time period, and the second critical time period may be greater than the first critical time period and less than the third critical time period.

The first UI feedback may include highlighting the focus indicator, the second UI feedback may include highlighting an adjacent region which is adjacent to the focused GUI item, and the third UI feedback may include adjusting a luminance of a remaining region other than a region including the focused GUI item the adjacent region.

The first UI feedback may include alternatingly changing a transparency of the focus indicator.

The display may include a display panel and a backlight configured to provide light to the display panel, and the at least one processor may be further configured to adjust the luminance of the remaining region through local dimming of the backlight.

The first UI feedback may include alternatingly changing a size of the focused GUI item, the second UI feedback may include at least one of highlighting an adjacent region which is adjacent to the focused GUI item, alternatingly changing a luminance of the focused GUI item, and alternatingly changing a transparency of the focused GUI item, and the third UI feedback may include adjusting a luminance of a remaining region other than a region including the focused GUI item.

The at least one processor may be further configured to control the display to temporarily provide the stepwise-changed UI feedback on the focus indicator within the critical time period based on receiving a user command for highlighting the focus indicator.

The at least one processor may be further configured to control the display to not provide the UI feedback on the focus indicator based on identifying a user input context corresponding to the UI screen while providing the stepwise-changed UI feedback on the focus indicator.

In accordance with an aspect of the disclosure, a method of providing a user interface (UI) for an electronic apparatus includes displaying a user interface (UI) screen including a plurality of graphical user interface (GUI) items and a focus indicator positioned on a focused GUI item from among the plurality of GUI items; providing UI feedback on the focus indicator based on a user input to the UI screen being not identified for greater than or equal to a critical time period; and stepwise changing the UI feedback on the focus indicator as a time in which the user input is not identified continues.

The changing of the UI feedback may include stepwise overlapping and providing individual UI feedback on the focus indicator as the time in which the user input is not identified continues.

The individual UI feedback may include the UI feedback on the focus indicator, UI feedback on an adjacent region which is adjacent to the focused GUI item, and UI feedback on a remaining region other than a region including the GUI item on which the focus indicator is positioned and the adjacent region.

The changing of the UI feedback may include providing a first UI feedback on the focus indicator based on the user input to the UI screen being not identified for greater than or equal to a first critical time period; overlapping and providing the first UI feedback and a second UI feedback on the focus indicator based on the user input to the UI screen being not identified for greater than or equal to a second critical time period; and overlapping and providing the first UI feedback, the second UI feedback, and a third UI feedback on the focus indicator based on the user input to the UI screen being not identified for greater than or equal to a third critical time period, and the second critical time period may be greater than the first critical time period and less than the third critical time period.

In accordance with an aspect of the disclosure, a non-transitory computer-readable medium storing instructions which, when executed by at least one processor, cause the at least one processor to: display a user interface (UI) screen including a plurality of graphical user interface (GUI) items and a focus indicator positioned on a focused GUI item from among the plurality of GUI items; provide UI feedback on the focus indicator based on a user input to the UI screen being not identified for greater than or equal to a critical time period; and stepwise change the UI feedback on the focus indicator as a time in which the user input is not identified continues.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
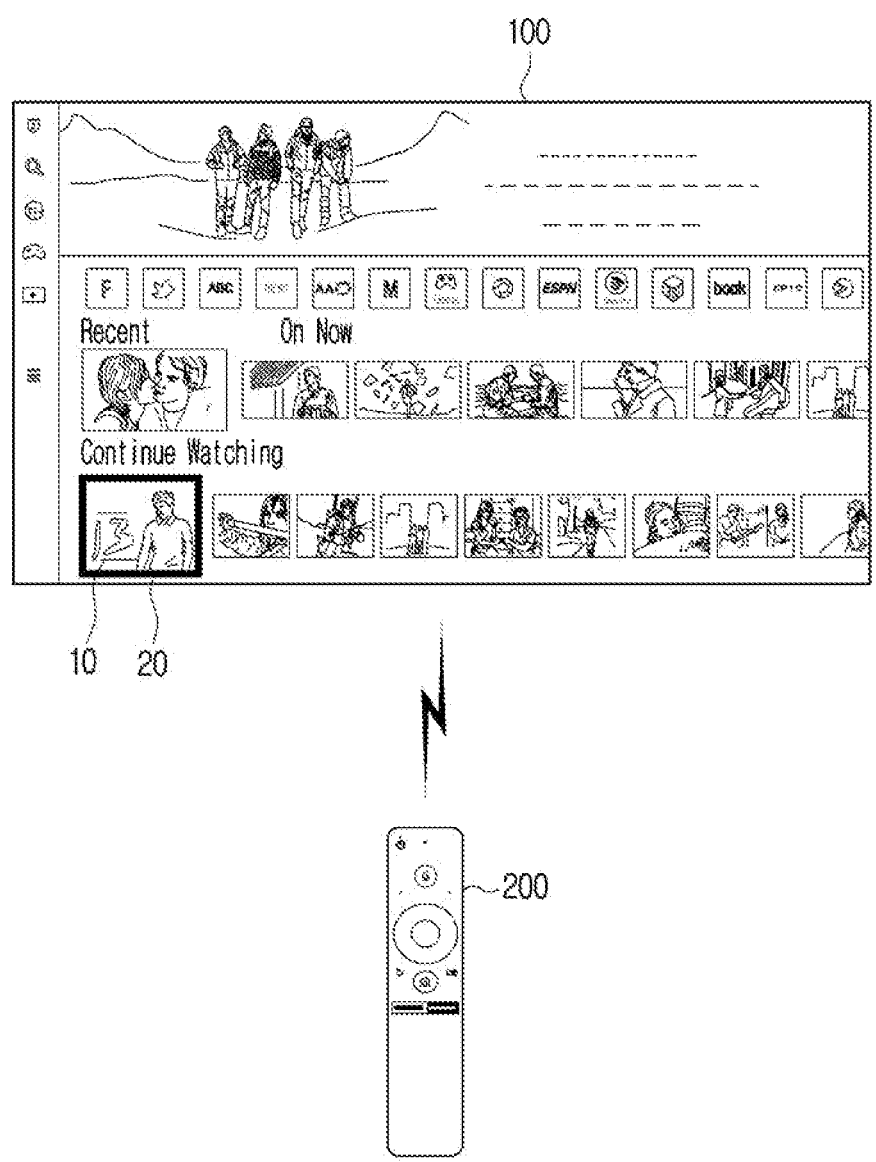
FIG. 1 is a view for explaining an implementation example of an electronic apparatus according to one or more embodiments of the disclosure.

Hereinafter, the embodiments are described in detail with reference to the accompanying drawings.

Terms used in the specification are briefly described, and the disclosure is then described in detail.

General terms may be used to describe embodiments of the disclosure in consideration of their functions in the disclosure. However, these terms may be changed depending on the intention of those skilled in the art or a judicial precedent, the emergence of a new technique, and the like. In addition, in a specific case, terms arbitrarily chosen by an applicant may exist. In this case, the meanings of such terms are mentioned in detail in corresponding descriptions of the disclosure. Therefore, the terms used in the disclosure may be defined on the basis of the meanings of the terms and the contents throughout the disclosure rather than simple names of the terms.

Terms "first," "second," and the like, may be used to describe various components. However, the components are not to be construed as being limited by these terms. The terms are used only to distinguish one component from another component.

A term of a singular number may include its plural number unless explicitly indicated otherwise in the context. It is to be understood that a term "include," "formed of," or the like used in this application specifies the existence of features, numerals, steps, operations, components, parts or combinations thereof, which is mentioned in the specification, and does not preclude the existence or addition of one or more other features, numerals, steps, operations, components, parts or combinations thereof.

An expression, "at least one of A or/and B" may indicate either "A or B," or "both of A and B."

As used herein, a "module" or a component with a name ending in "~er/~or" may perform at least one function or operation, may be implemented by hardware or software, or be implemented by a combination of hardware and software. In addition, a plurality of "modules" or a plurality of components with names ending in "~ers/~ors" may be integrated in at least one module to be implemented by at least one processor except for a "module" or a component with a name ending in "~er/or" which must to be implemented by a specific hardware.

Hereinafter, embodiments of the disclosure are described in detail with reference to the accompanying drawings. However, the disclosure may be modified in various different forms, and is not limited to the embodiments provided in the specification. In addition, in the drawings, portions unrelated to the description may be omitted for convenience of illustration and description, and similar portions are denoted by similar reference numerals throughout the specification.

FIG. 1 is a view for explaining an implementation example of an electronic apparatus according to one or more embodiments of the disclosure.

Referring to FIG. 1, an electronic apparatus 100 may include a display device which may be remotely controlled by a remote control device 200. However, embodiments are not limited thereto, and in embodiments the electronic apparatus 100 may be any device having a display function, such as a television (TV), a desktop personal computer (PC), a laptop PC, a large format display (LFD), a digital signage, a digital information display (DID), a video wall, a projector, a refrigerator, an air conditioner, an air purifier, or a medical device. Here, the remote control device 200 may include a remote controller. However, embodiments are not limited thereto, and in embodiments the remote control device may include a device which may be remotely controlled using an application such as a smartphone.

According to one or more embodiments, a processor 130 may control a display 110 to display various types of screens which may be controlled by the remote control device 200, such as a user interface (UI) screen including a plurality of graphical user interface (GUI) items and a content playback screen.

According to one or more embodiments, the electronic apparatus 100 may provide a UI screen including a plurality of GUI items having various sizes and/or various ratios, and a focus indicator 20 positioned on any one GUI item 10 among the GUI items. In embodiments, the GUI item 10 on which the focus indicator is positioned may be referred to as a focused GUI item. According to one or more embodiments, a navigation operation between a plurality of GUI items may be controlled by various types of focus control methods based on the form of implementation of the electronic apparatus 100, such as a predetermined navigation input, for example, a press operation (e.g., long press input) on a specific button positioned in the remote control device 200, a touch scroll operation, a scroll button operation, a continuous key input in a wheel input device, or the like. Here, the types of the focus control method may include various types such as a moving focus method and a fixed focus method.

According to one or more embodiments, a user may lose a focus in various cases such as a case in which a user command for focus control, for example, a control signal from the remote control device 200, is not received for a predetermined period of time, a case in which the focus is unable to be moved any more due to a direction limit of an UI element, or the like.

Accordingly, embodiments may improve a user experience (UX) by providing a focus highlighting effect subdivided into a plurality of stages while the user loses the focus.

Figure 2A:
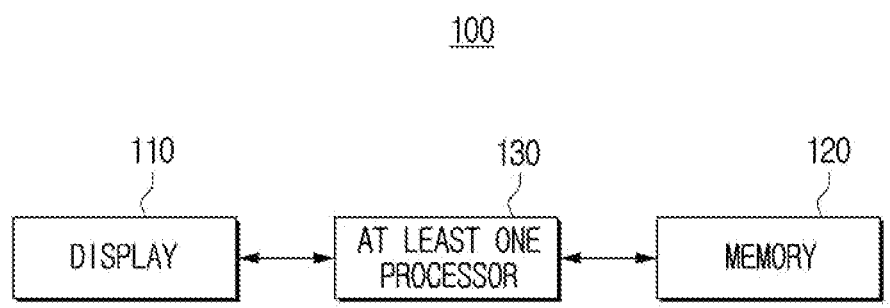
FIG. 2A is a block diagram showing a configuration of the electronic apparatus according to one or more embodiments.

FIG. 2A is a block diagram showing a configuration of the electronic apparatus according to one or more embodiments.

According to FIG. 2A, the electronic apparatus 100 may include the display 110, a memory 120, and at least one processor 130.

The electronic apparatus 100 may include an input panel such as a touch panel or a touch screen, or implemented as an electronic device including the touch panel or the touch screen, such as a laptop personal computer (PC), a mobile phone, a smartphone, an electronic board, a digital signage, a portable multimedia player (PMP), an MP3 player, a game machine, a kiosk, a monitor, and the like.

The display 110 may include a self-light emitting element, or a non self-light emitting element and a backlight. For example, the display may include a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, a quantum dot light-emitting diode (QLED) display. The display 110 may also include a driving circuit, a backlight unit and the like, and may be implemented in as an amorphous silicon (a-Si) thin film transistor (TFT), a low temperature poly silicon (LTPS) TFT, an organic TFT (OTFT). In embodiments, the display 110 may include a touch screen combined with a touch sensor, a flexible display, a rollable display, a three-dimensional (3D) display, a display in which a plurality of display modules are physically connected with each other, or the like.

The memory 120 may store data used for various embodiments. The memory 120 may be embedded in the electronic apparatus 100, or may be detachable from the electronic apparatus 100, based on a data storing purpose. For example, data for driving the electronic apparatus 100 may be stored in a memory embedded in the electronic apparatus 100, and data for the extended function of the electronic apparatus 100 may be stored in a detachable memory in the electronic apparatus 100. In embodiments, the memory embedded in the electronic apparatus 100 may include at least one of a volatile memory (for example, a dynamic random access memory (DRAM), a static RAM (SRAM), or a synchronous dynamic RAM (SDRAM)), a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM, a flash memory (for example, a NAND flash, or a NOR flash), a hard drive, or a solid state drive (SSD)). In addition, the memory detachable from the electronic apparatus 100 may be implemented in the form of a memory card (for example, a compact flash (CF), a secure digital (SD), a micro secure digital (Micro-SD), a mini secure digital (Mini-SD), an extreme digital (xD), or a multi-media card (MMC)), or an external memory which may be connected to a universal serial bus (USB) port (for example, a USB memory).

The at least one processor 130 may control an overall operation of the electronic apparatus 100. In detail, the at least one processor 130 may be connected to each component of the electronic apparatus 100 to thus control the overall operation of the electronic apparatus 100. For example, the at least one processor 130 may be electrically connected to the display 110 and the memory 120 to thus control the overall operation of the electronic apparatus 100. The at least processor 130 may be one processor or multiple processors that perform one or more operations sequentially or in parallel.

The at least one processor 130 may perform the operation of the electronic apparatus 100 according to various embodiments by performing at least one instruction stored in the memory 120. For example, the at least one processor 130 may be electrically connected to the display 110 and the memory 120 to control the overall operation of the electronic apparatus 100. The at least one processor 130 may be or may include one or more processors.

The at least one processor 130 may perform the operation of the electronic apparatus 100 according to various embodiments by performing at least one instruction stored in the memory 120.

The at least one processor 130 may include at least one of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 130 may control other components of the electronic device or any combination thereof, and may perform an operation related to communication or data processing. The at least one processor 130 may execute at least one program or instruction stored in the memory. For example, the at least one processor 130 may perform a method according to one or more embodiments of the disclosure by executing at least one instruction stored in memory.

A plurality of operations may be performed by one processor or may be performed by two or more processors based on the method according to one or more embodiments of the disclosure including the plurality of operations. For example, a first operation, a second operation, and a third operation may be performed by the method according to one or more embodiments. In this case, the first operation, the second operation, and the third operation may all be performed by a first processor, according to embodiments. In other embodiments, the first operation and the second operation may be performed by the first processor (for example, a general-purpose processor), and the third operation may be performed by a second processor (for example, an artificial intelligence-only processor).

The at least one processor 130 may include a single core processor including one core, or may include at least one multi-core processor including multi-cores (e.g., homogeneous multi-cores or heterogeneous multi-cores). Based on the at least one processor 130 being implemented as the multi-core processor, each of the multi-cores included in the multi-core processor may include a processor internal memory such as a cache memory or an on-chip memory. Here, a common cache shared by the multi-cores may be included in the multi-core processor. In addition, each of the multi-cores included in the multi-core processor (or some of the multi-cores) may independently read and perform a program instruction for implementing the method according to one or more embodiments of the disclosure, or all (or some) of the multi-cores may be linked with each other to read and perform the program instruction for implementing the method according to one or more embodiments of the disclosure.

Based on the method according to one or more embodiments of the disclosure including a plurality of operations, the plurality of operations may be performed by one core among the multi-cores included in the multi-core processor, or may be performed by the multi-cores. For example, the first operation, the second operation, and the third operation may be performed by the method according to one or more embodiments. In this case, the first operation, the second operation, and the third operation may all be performed by the first core included in the multi-core processor, according to embodiments. In other embodiments, the first operation and the second operation may be performed by the first core included in the multi-core processor, and the third operation may be performed by a second core included in the multi-core processor.

In the embodiments of the disclosure, the processor may refer to a system-on-chip (SoC) in which at least one processor and other electronic components are integrated, the single core processor, the multi-core processor, or the core included in the single core processor or the multi-core processor. Here, the core may include the CPU, the GPU, the APU, the MIC, the DSP, the NPU, the hardware accelerator, the machine learning accelerator, or the like. However, embodiments are not limited thereto. As used herein, the processor 130 may refer to at least one processor 130. For example, operations described herein as being performed by the processor 130 may be performed by one processor 130, or by multiple processors 130, according to embodiments.

Figure 2B:
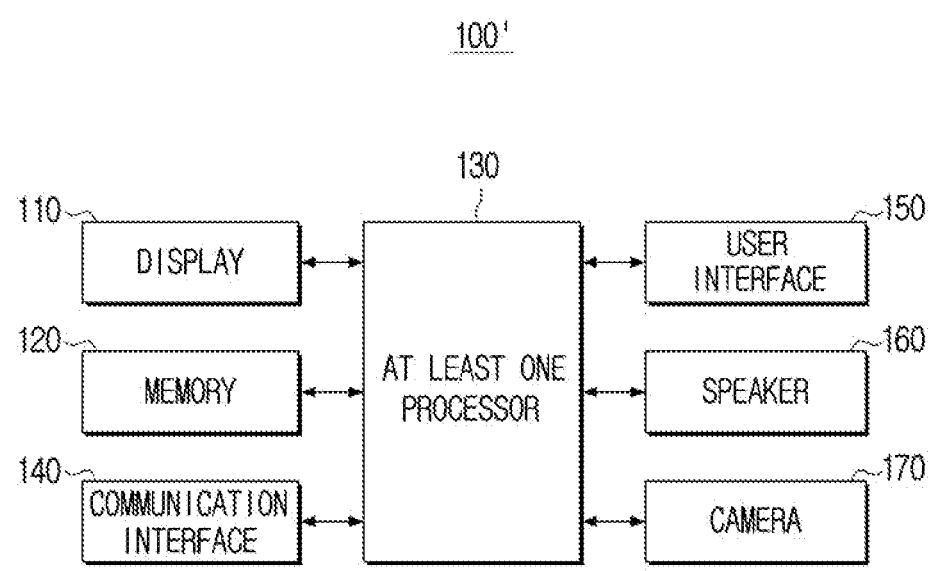
FIG. 2B is a block diagram showing a detail configuration of the electronic apparatus according to one or more embodiments.

FIG. 2B is a block diagram showing a detailed configuration of an example of the electronic apparatus according to one or more embodiments.

Referring to FIG. 2B, an electronic apparatus 100' may include a display 110, a memory 120, at least one processor 130, a communication interface 140, a user interface 150, a speaker 160, and a camera 170 Hereinafter, description of components illustrated in FIG. 2B which is redundant or duplicative with respect to FIG. 2A may be omitted.

The communication interface 140 may include various interfaces based on an example implementation of the electronic apparatus 100'. For example, the communication interface 140 may communicate with an external device, an external storage medium (e.g., USB memory), an external server (e.g., a web hard) or the like by using a communication protocol or standard such as Bluetooth, access point (AP) based wireless fidelity (Wi-Fi, i.e., wireless local area network (LAN)), zigbee, wired/wireless local area network (LAN), wide area network (WAN), Ethernet, IEEE 1394, high definition multimedia interface (HDMI), universal serial bus (USB), mobile high-definition link (MHL), audio engineering society/European broadcasting union (AES/EBU) communication, optical communication, and coaxial communication. According to one or more embodiments, the communication interface 140 may communicate with a remote control device or a user terminal having a remote control function.

The user interface 150 may include a device such as a button, a touch pad, a mouse or a keyboard, or may include a touch screen which may also perform a manipulation input function in addition to the above-described display function.

The speaker 160 may be a component outputting not only various audio data but also various notification sounds or voice messages. The processor 130 may control the speaker to output information or various notifications corresponding to the UI screen according to various embodiments of the disclosure in the form of audio.

The camera 170 may be turned on based on a predetermined event and perform an image capture. The camera 170 may convert a captured image into an electrical signal and generate image data based on the converted signal. For example, an object may be converted into an electrical image signal through a charge coupled device (CCD), and the converted image signal may be amplified and converted into a digital signal and then signal-processed.

The electronic apparatus 100' may further include a microphone, a tuner and a demodulator in an example implementation. The microphone may be configured to receive a user voice or other sounds, and convert the same into audio data. However, the electronic apparatus 100' according to another embodiment may receive the user voice input through the external device by using the communication interface 140.

The tuner may receive a radio frequency (RF) broadcast signal by tuning a channel selected by the user or all pre-stored channels among RF broadcast signals received through an antenna. The demodulator may receive and demodulate a digital intermediate frequency (DIF) signal converted by the tuner, and also perform channel decoding or the like.

Figure 3:
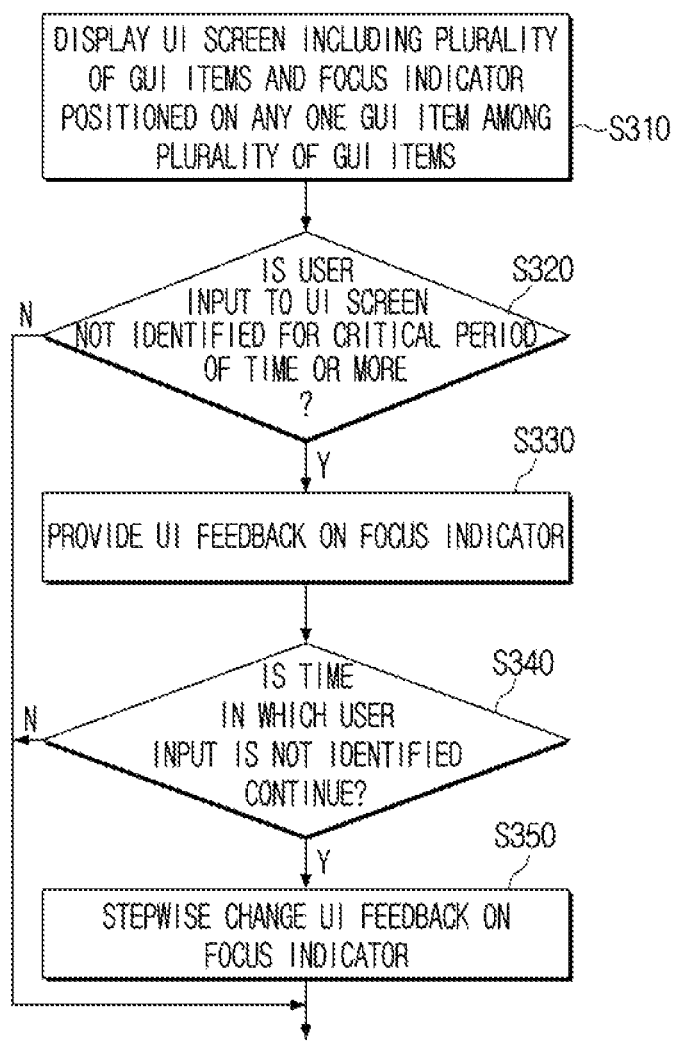
FIG. 3 is a view for explaining a process for providing a user interface (UI) screen for an electronic apparatus according to one or more embodiments.

FIG. 3 is a view for explaining a process for providing a user interface (UI) screen for an electronic apparatus according to one or more embodiments.

According to an embodiment shown in FIG. 3, the processor 130 may control the display 110 to display the UI screen including the plurality of GUI items and the focus indicator positioned on any one GUI item among the plurality of GUI items at operation S310.

Here, the GUI item may include various types of images or texts corresponding to various types of content such as image content, video content, application, and advertisement content. For example, the GUI item may be a thumbnail, a representative image, a title, a description, or the like, representing the corresponding content, and include an image or a text for identifying the corresponding content.

According to one or more embodiments, the GUI items may each have a specific shape (e.g., rectangular shape, a rounded rectangular shape, a circular shape, or a diamond shape), and be arranged in a specific direction such as a horizontal direction, a vertical direction, or a diagonal direction. The focused GUI item may be a GUI item whose edge is highlighted, is not necessarily limited thereto, and may be a GUI item whose entire portion or partial edge is highlighted.

At operation S320, the processor 130 may determine whether a user input is not received for an amount of time which is greater than or equal to a critical period of time. Based on user input to the UI screen being not received for greater than or equal to the critical period of time (Y at operation S320), the processor 130 may control the display 110 to provide UI feedback on the focus indicator at operation S330. Here, the UI feedback may be UI feedback highlighting the focus indicator. For example, the UI feedback may include UI feedback which includes alternatingly changing transparency of the focus indicator. In embodiments, alternatingly changing the transparency of the focus indicator may include, for example, displaying the focus indicator with a first transparency, then displaying the focus indicator with a second transparency, then displaying the focus indicator with the first transparency, and so on. However, embodiments are not limited thereto, and may include at least one of UI feedback alternatingly changing the transparency of the focus indicator, UI feedback alternatingly changing luminance (or brightness) of the focus indicator, or UI feedback alternatingly changing a size of a GUI item on which the focus indicator is positioned.

At operation S340, the processor 130 may determine whether the time in which the user input is not received continues. Based on the time in which the user input is not received continuing (Y at operation S340), the processor 130 may then control the display 110 to stepwise change the UI feedback on the focus indicator at operation S350.

For example, the processor 130 may change the UI feedback on the focus indicator by stepwise overlapping and providing individual UI feedbacks on the focus indicators as the time in which the user input is not identified continues. Here, the individual UI feedback may include the UI feedback on the focus indicator, UI feedback on a region adjacent to the GUI item on which the focus indicator is positioned, and UI feedback on a remaining region other than the region including the GUI item on which the focus indicator is positioned and the region adjacent to the GUI item on which the focus indicator is positioned.

According to one or more embodiments, the processor 130 may control the display 110 to change the UI feedback by increasing the number of overlapping UI feedbacks as the time in which the user input is not identified continues. For example, as the time elapses, the UI feedback may be changed in an order of a first UI feedback, followed by a combination of the first UI feedback and the second UI feedback, followed by a combination of the first UI feedback, the second UI feedback, and a third UI feedback.

In another example, the processor 130 may control the display 110 to change the UI feedback by overlapping different UI feedbacks as the time in which the user input is not identified continues. For example, as the time elapses, the UI feedback may be changed in order of the first UI feedback, followed by a combination of the first UI feedback and the second UI feedback, followed by a combination of the first UI feedback and the third UI feedback. As another example, the UI feedback may be changed in order of the first UI feedback, followed by a combination of the first UI feedback and the second UI feedback followed by a combination of the second UI feedback and the third UI feedback.

Figure 4:
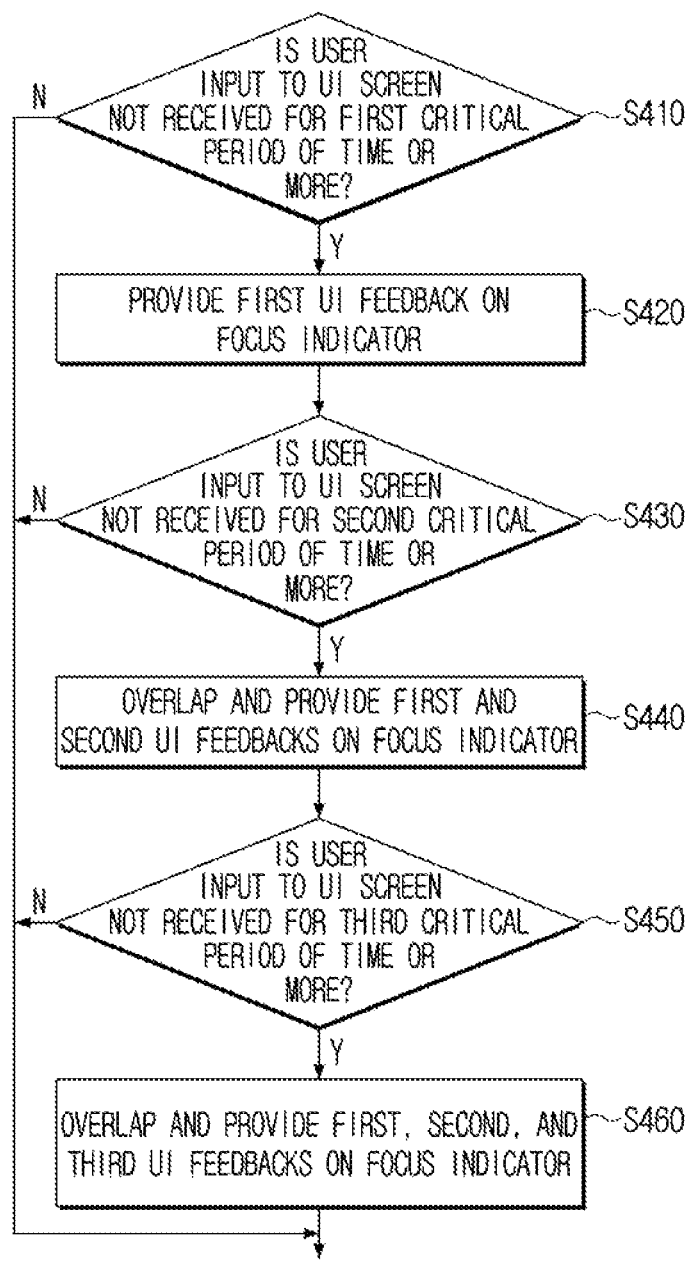
FIG. 4 is a view for explaining a process for providing a UI screen according to one or more embodiments.

FIG. 4 is a view for explaining a process for providing a UI screen according to one or more embodiments.

At operation S410, the processor 130 may determine whether a user input is not received for greater than or equal to a first critical period of time. Based on user input to the UI screen being not received for greater than or equal to the first critical period of time (Y at operation S410), the processor 130 may provide the first UI feedback on the focus indicator at operation S420. According to one or more embodiments, the first UI feedback may include UI feedback highlighting the focus indicator.

At operation S430, the processor 130 may determine whether a user input is not received for greater than or equal to a second critical period of time. Based on user input to the UI screen being not received for greater than or equal to the second critical period of time (Y at operation S430), the processor 130 may overlap and provide the first UI feedback and the second UI feedback on the focus indicator at operation S440. Here, the second critical period of time may be greater than the first critical period of time. According to one or more embodiments, the second UI feedback may include UI feedback highlighting the region adjacent to the GUI item on which the focus indicator is positioned.

At operation S450, the processor 130 may determine whether a user input is not received for greater than or equal to a third critical period of time. Based on user input to the UI screen being not received for greater than or equal to the third critical period of time (Y at operation S450), the processor 130 may overlap and provide the first UI feedback, the second UI feedback, and the third UI feedback on the focus indicator at operation S460. Here, the third critical period of time may be greater than the second critical period of time. That is, the second critical period of time of the operation S430 may be greater than the first critical period of time of the operation S410, and less than the third critical period of time of the operation S450. According to one or more embodiments, the third UI feedback may include UI feedback adjusting luminance of a remaining region other than the region including the GUI item on which the focus indicator is positioned and the region adjacent to the GUI item on which the focus indicator is positioned.

Figure 5:
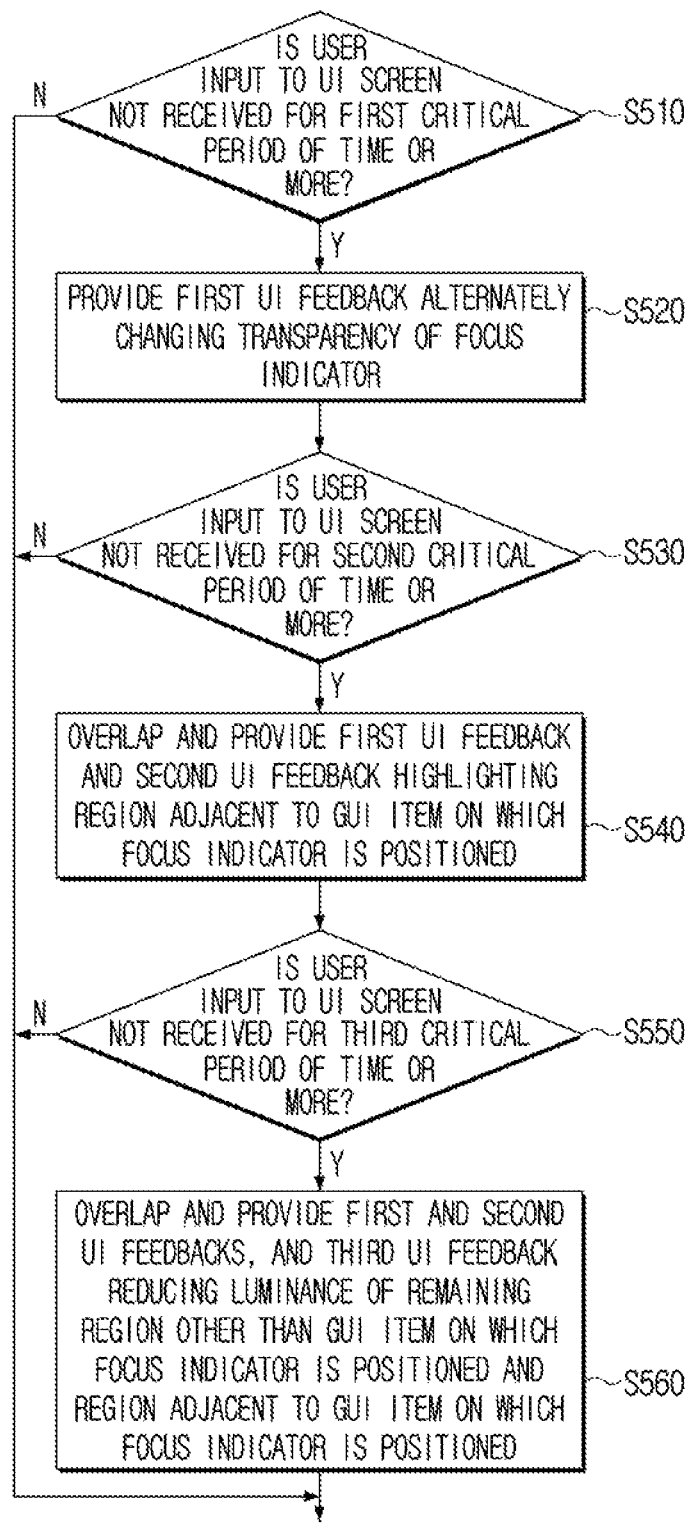
FIG. 5 is a view for explaining a process for providing UI screen for an electronic apparatus according to one or more embodiments.

FIG. 5 is a view for explaining a process for providing a UI screen for an electronic apparatus according to one or more embodiments.

At operation S510, the processor 130 may determine whether a user input is not received for greater than or equal to a first critical period of time. Based on user input to the UI screen being not received for greater than or equal to the first critical period of time (Y at operation S510), the processor 130 may provide the UI feedback by alternatingly changing the transparency of the focus indicator at operation S520. In this case, the focus indicator may be highlighted for the user to recognize that the focus indicator flickers.

At operation S530, the processor 130 may determine whether a user input is not received for greater than or equal to a second critical period of time. Based on user input to the UI screen being not received for greater than or equal to the second critical period of time (Y at operation S530), at operation S540 the processor 130 may overlap and provide the first and second UI feedbacks of the operation S520. Here, the second UI feedback may include the UI feedback highlighting the region adjacent to the GUI item on which the focus indicator is positioned. Here, the highlight may include various effects such as the illumination effect, gradation effect, and ray effect of highlighting the adjacent region.

At operation S550, the processor 130 may determine whether a user input is not received for greater than or equal to a third critical period of time. Based on user input to the UI screen being not received for greater than or equal to the third critical period of time (Y at operation S550), at operation S560 the processor 130 may overlap and provide the first UI feedback of the operation S520, and the second, and third UI feedbacks of the operation S530. Here, the third UI feedback may include UI feedback reducing the luminance of the remaining region other than the region including the GUI item on which the focus indicator is positioned and the region adjacent to the GUI item on which the focus indicator is positioned.

Figure 6:
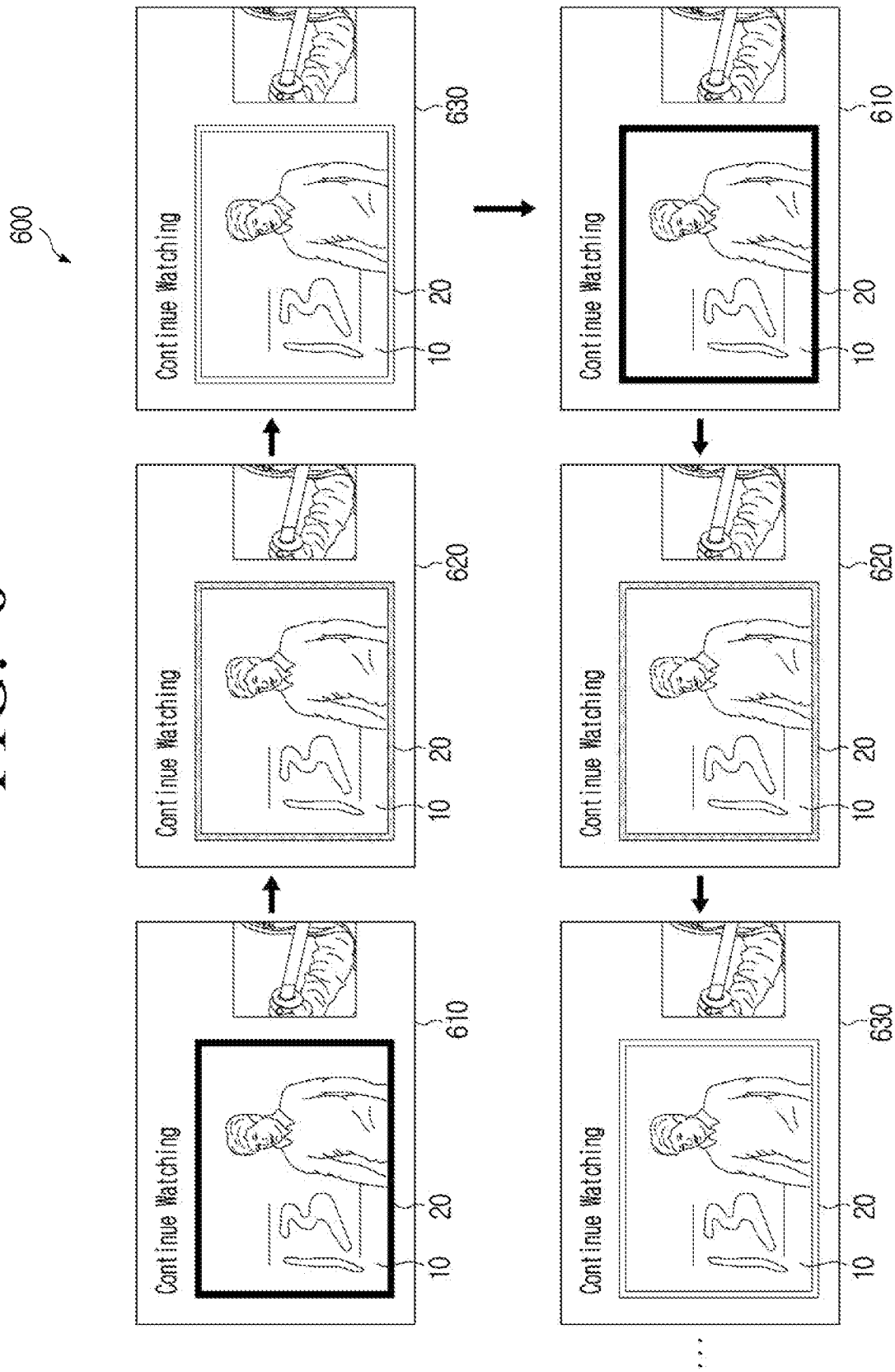
FIG. 6 is a view for explaining an example of a first UI feedback according to one or more embodiments.

FIG. 6 is a view for explaining an example of the first UI feedback according to one or more embodiments.

According to one or more embodiments, the first UI feedback may include alternatingly changing transparency of a focus indicator 20 as shown in FIG. 6.

For example, as shown in FIG. 6, in order to provide the first UI feedback 600, the transparency of the focus indicator 20 positioned on the GUI item 10 may be alternatingly changed. For example, the transparency of the focus indicator 20 may be alternatingly changed in order of a first UI 610 in which the transparency of the focus indicator 20 is a first transparency, followed by a second UI 620 in which the transparency of the focus indicator 20 is a second transparency, followed by a third UI 630 in which the transparency of the focus indicator 20 is a third transparency, followed by the first UI 610, followed by the second UI 620, followed by the third UI 630, and so on. However, embodiments are not limited thereto, and the transparency may also be changed in order of the first UI 610, followed by the second UI 620, followed by the third UI 630, followed by the second UI 620, followed by the first UI 610, and so on. For example, as shown in FIG. 6, the transparency may be increased in order of the first transparency, followed by the second transparency, followed by the third transparency.

According to one or more embodiments, the UI feedback alternatingly changing the transparency of the focus indicator may be provided using alpha blending. Here, alpha blending may refer to a method of assigning a new value referred to as alpha (A) to red-green-blue (RGB) color values and then displaying a mixture of the background RGB value and the alpha value thereon to provide a transparent effect in case of overlapping another image on top of an image. For example, the alpha value may be divided into values from zero to 255, or values from 0.0 to 1.0. Here, zero may indicate completely transparent, and 255 (or the highest value such as 1.0) may conversely indicate fully opaque. However, embodiments are not limited thereto. For example, in embodiments, zero may indicate fully opaque, and 255 (or the highest value such as 1.0) may conversely indicate completely transparent. For example, based on 8 bits bring assigned to the alpha value to express values from zero to 255, the higher a corresponding value, the higher a ratio of a corresponding pixel, and vice versa. According to one or more embodiments, the processor 130 may mix a graphic image A including the focus indicator with a remaining graphic image B (e.g., an image including a plurality of GUI items). In this case, a mixing operation may be expressed as, for example, $A*alpha+B*(1-alpha)$, or as $B*(1-alpha)+A*alpha$, or as $B*alpha+G$. For example, the processor 130 may continuously mix and provide the plurality of graphic images A in which a transparency of the region corresponding to the focus indicator is changed while maintaining the graphic image B.

Figure 7:
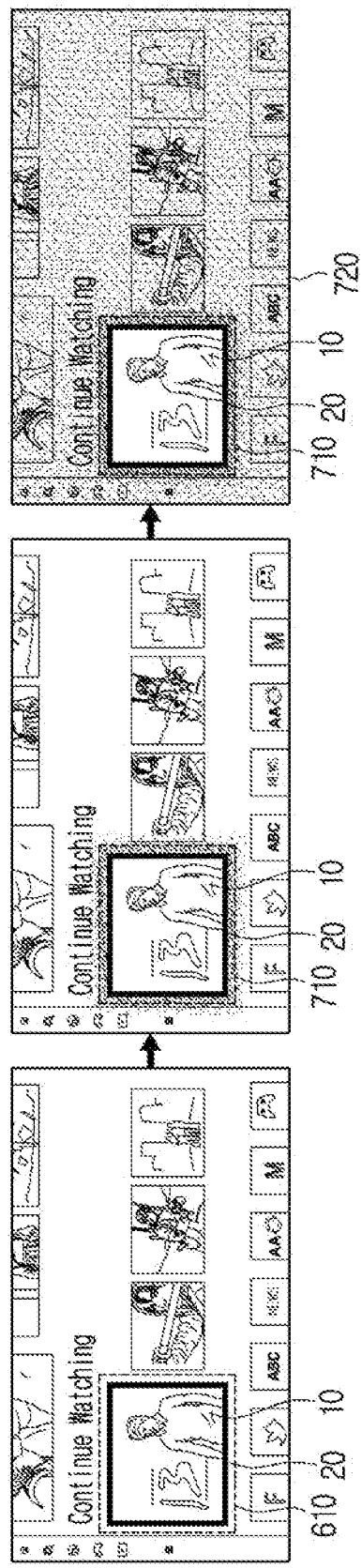
FIG. 7 is a view for explaining an example where a UI feedback is stepwise changed according to one or more embodiments.

FIG. 7 is a view for explaining an example where a UI feedback is stepwise changed according to one or more embodiments.

According to an embodiment shown in FIG. 7, the processor 130 may provide the first UI feedback 600 based on the user input to the UI screen being not received for greater than or equal to the first critical period of time. For example, the first UI feedback 600 may be feedback provided by alternatingly changing the transparency of the focus indicator 20 positioned on the GUI item 10 as described above with reference to FIG. 6.

Next, the processor 130 may overlap and provide the first UI feedback 600 and the second UI feedback 710 as the time elapses, for example based on the user input to the UI screen being not received for greater than or equal to the second critical period of time, which may be greater than the first critical period of time. Here, the second UI feedback 710 may indicate an effect of highlighting an external region adjacent to the focus indicator. For example, the second UI feedback 710 may include at least one of various effects such as the illumination effect, gradation effect, and ray effect of highlighting the external region adjacent to the focus indicator. The highlighting effect of the adjacent region may also be provided using the alpha blending, and is not necessarily limited thereto. According to one or more embodiments, the processor 130 may mix and provide the graphic image A including the focus indicator, a graphic image C including the highlighting effect of the adjacent region, and remaining graphic images (e.g., image including a plurality of GUI items).

Next, the processor 130 may further provide the third UI feedback 720 while overlapping and providing the first UI feedback 600 and second UI feedback 710 as the time elapses, for example based on the user input to the UI screen being not received for greater than or equal to the third critical period, which may be greater than the second critical period of time. Here, the third UI feedback 720 may include reducing the luminance of the remaining region other than the region including the GUI item on which the focus indicator is positioned and the region adjacent to the indicator item on which the focus indicator is positioned.

Figure 8:
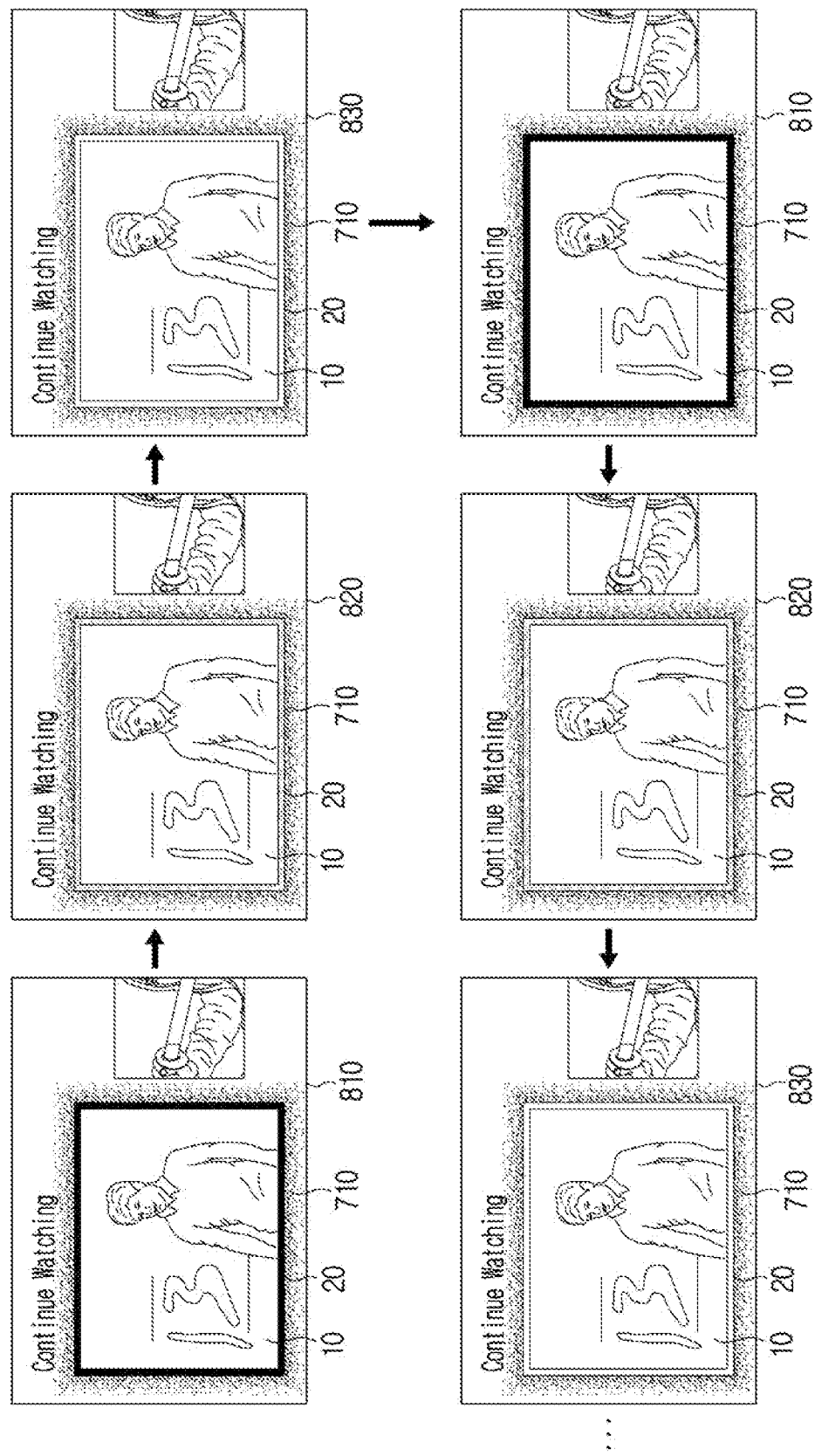
FIG. 8 is a view for explaining an example where first and second UI feedbacks are provided while overlapping each other according to one or more embodiments.

FIG. 8 is a view for explaining an example where first and second UI feedbacks are provided while overlapping each other according to one or more embodiments.

According to one or more embodiments, the processor 130 may overlap and provide the first UI feedback 600 with a second UI feedback 710 based on the user input to the UI screen being not identified for greater than or equal to the second critical period of, which may be greater than the first critical period of time.

According to one or more embodiments, as shown in FIG. 8, the processor 130 may provide the first UI feedback 600 by alternatingly changing the transparency of the focus indicator 20 positioned on the GUI item 10. In addition, as shown in FIG. 8, the processor 130 may overlap and provide the first UI feedback 600 with the second UI feedback 710. For example, the second UI feedback 710 may include at least one of the various effects such as the illumination effect, gradation effect, and ray effect of highlighting the external region adjacent to the focus indicator 20.

For example, while the second UI feedback 710 is provided, the transparency of the focus indicator 20 may be alternatingly changed in the order of a first UI 810 in which the transparency of the focus indicator 20 is the first transparency, followed by a second UI 820 in which the transparency of the focus indicator 20 is the second transparency, followed by a third UI 830 in which the transparency of the focus indicator 20 is the third transparency, followed by the first UI 810, followed by the second UI 820, followed by the third UI 830.

Figure 9:
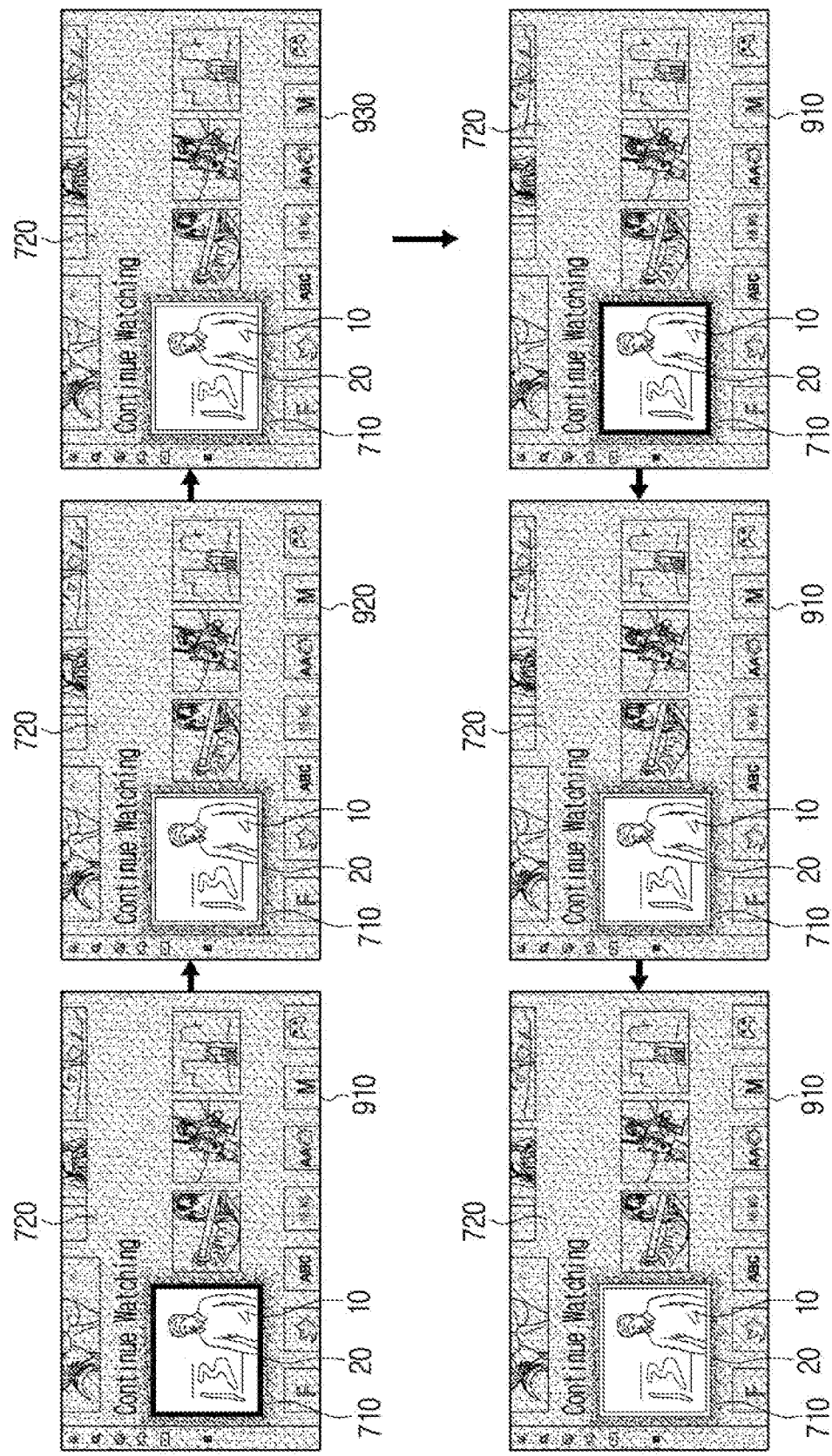
FIG. 9 is a view for explaining an example where first, second, and third UI feedbacks are provided while overlapping one another according to one or more embodiments.

FIG. 9 is a view for explaining an example where first, second, and third UI feedbacks are provided while overlapping one another according to one or more embodiments.

According to one or more embodiments, the processor 130 may overlap and provide the first UI feedback 600 with the second UI feedback 710 and the third UI feedback 720 based on the user input to the UI screen being not received for greater than or equal to the third critical period, which may be greater than the second critical period of time.

According to one or more embodiments, as shown in FIG. 9, the processor 130 may provide the first UI feedback 600 by alternatingly changing the transparency of the focus indicator 20 positioned on the GUI item 10. In addition, as shown in FIG. 9, the processor 130 may overlap and provide the first UI feedback 600 with the second UI feedback 710. For example, the second UI feedback 710 may include at least one of the various effects such as the illumination effect, gradation effect, and ray effect of highlighting the external region adjacent to the focus indicator 20. In addition, as shown in FIG. 9, the processor 130 may overlap and provide the first UI feedback 600 and the second UI feedback 710 with the third UI feedback 720. For example, as shown in FIG. 9, the third UI feedback may be feedback reducing the luminance of the remaining region other than the region including the GUI item 10, the focus indicator 20, and a region where the second UI feedback is provided.

For example, while the second UI feedback 710 and the third feedback 730 are provided, the transparency of the focus indicator 20 may be alternatingly changed in the order of a first UI 910 in which the transparency of the focus indicator 20 is the first transparency, followed by a second UI 920 in which the transparency of the focus indicator 20 is the second transparency, followed by a third UI 930 in which the transparency of the focus indicator 20 is the third transparency, followed by the first UI 910, followed by the second UI 920, followed by the third UI 930.

Figure 10:
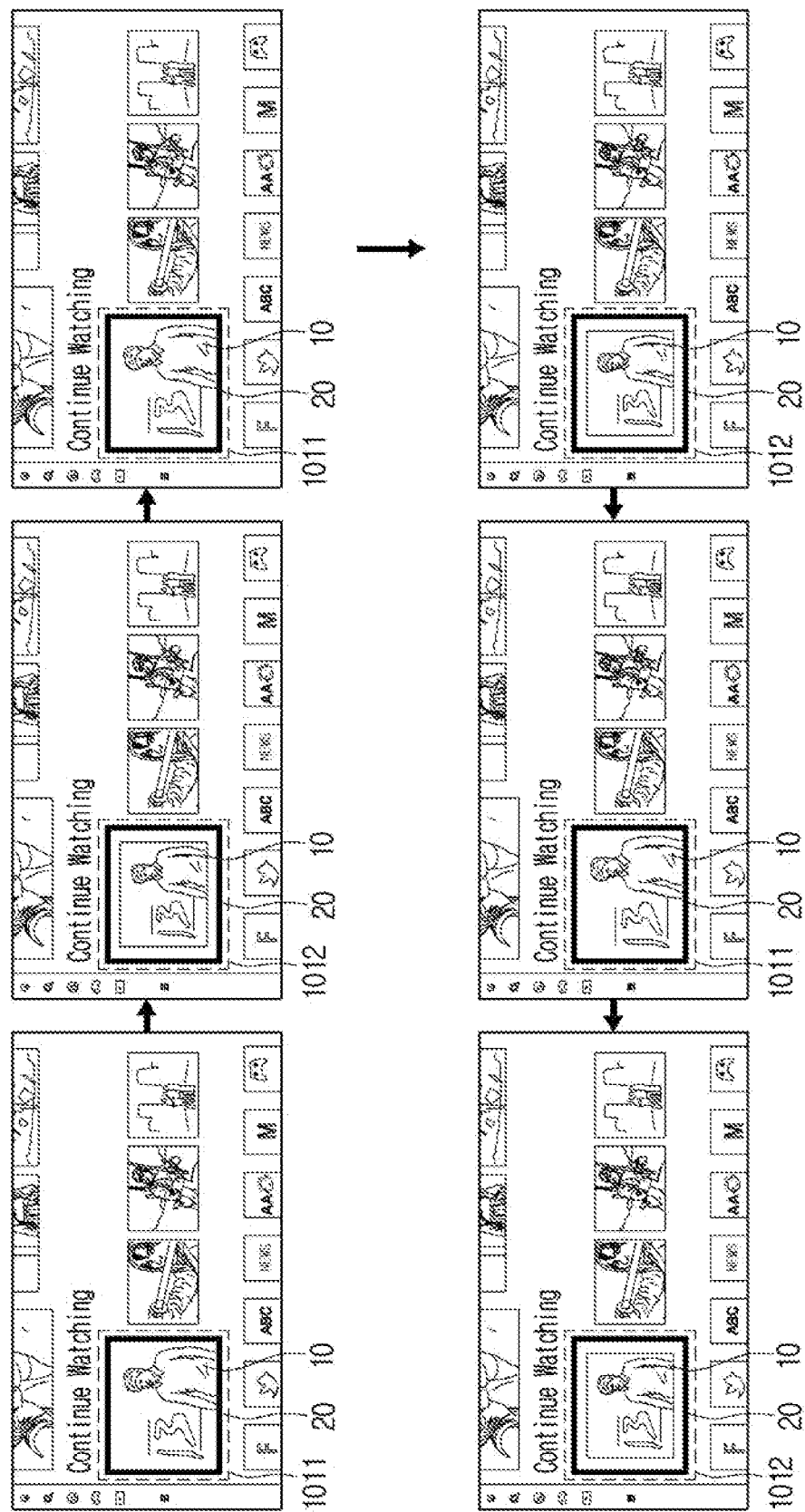
FIG. 10 is a view for explaining an example of a first UI feedback according to one or more embodiments.

FIG. 10 is a view for explaining an example of the first UI feedback according to one or more embodiments.

According to one or more embodiments, as shown in FIG. 10, the first UI feedback may be UI feedback alternatingly changing a size of a GUI item on which the focus indicator 20 is positioned.

For example, as shown in FIG. 10, according to a first UI feedback 1000, a size of the GUI item 10 may be alternatingly changed by repeating reduction/enlargement. For example, the size of the GUI item 10 may be alternatingly changed in order of a first UI 1011 in which the size of the GUI item 10 is a first size, followed by a second UI 1012 in which the size of the GUI item 10 is a second size, followed by the first UI 1011, followed by the second UI 1012, and so on. The size of the GUI item 10 may be alternatingly changed to three or more sizes instead of the two sizes. The size of the GUI item 10 may be changed in the order of the first size, followed by the second size, followed by a third size, followed by the first size, followed by the second size, and so on. As another example, size of the GUI item 10 may be changed in the order of the first size, followed by the second size, followed by the third size, followed by the second size, followed by the first size.

Figure 11:
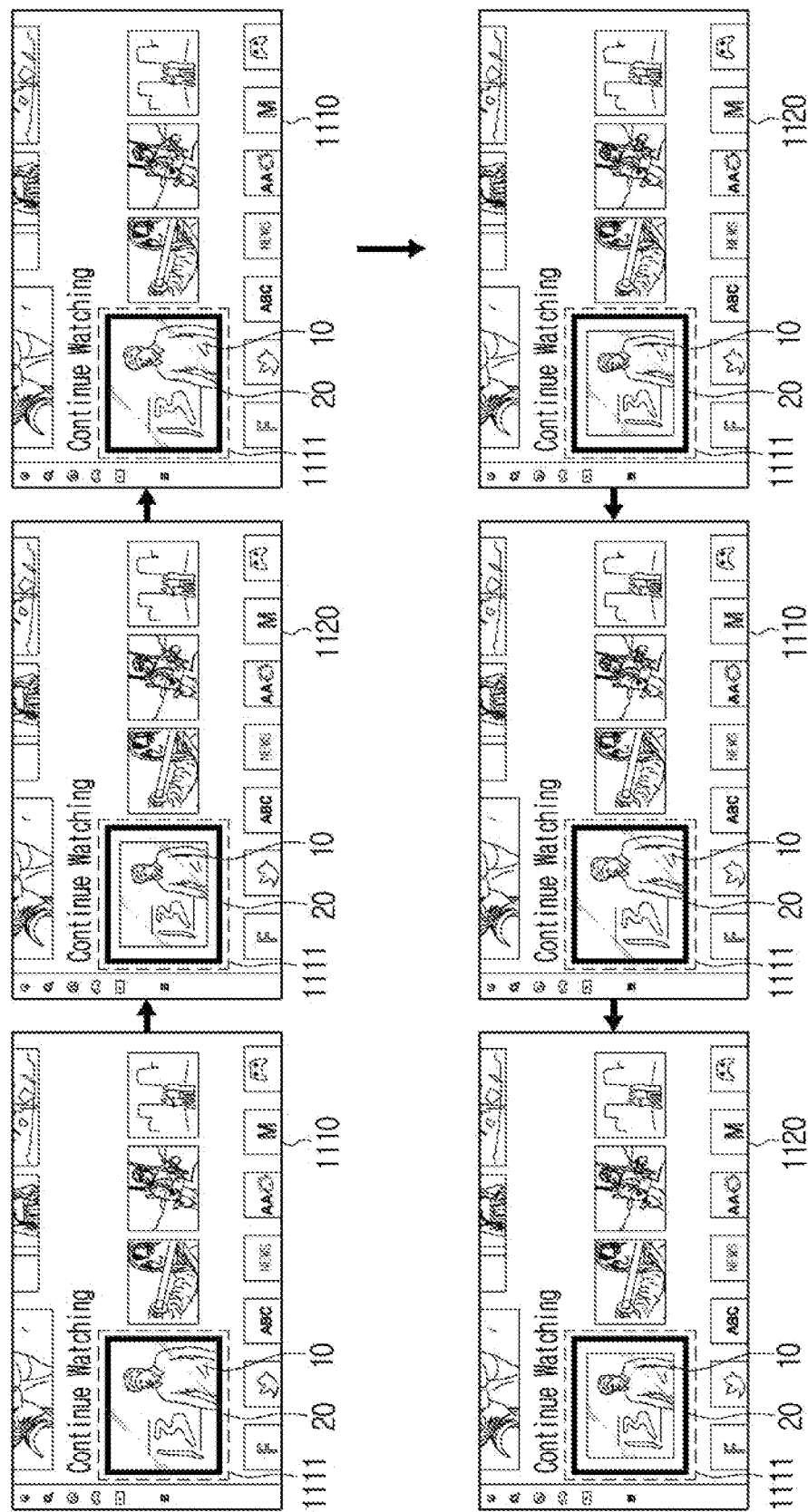
FIG. 11 is a view for explaining an example where first and second UI feedbacks are provided while overlapping each other according to one or more embodiments.

FIG. 11 is a view for explaining an example where the first and second UI feedbacks are provided while overlapping each other according to one or more embodiments.

According to one or more embodiments, the processor 130 may overlap and provide the first UI feedback 1000 with a second UI feedback 1111 based on the user input to the UI screen being not received for greater than or equal to the second critical period of time, which may be greater than the first critical period of time. According to one or more embodiments, as shown in FIG. 11, the first UI feedback may be UI feedback alternatingly changing the size of the GUI item on which the focus indicator 20 is positioned.

For example, as shown in FIG. 11, a size of the GUI item 10 may be alternately changed by repeating reduction/enlargement. In addition, as shown in FIG. 11, the processor 130 may overlap and provide the first UI feedback 1000 with the second UI feedback 1111. For example, the second UI feedback 1111 may be feedback providing the highlighting effect to the GUI item 10. For example, the second UI feedback 1111 may provide the illumination effect to the GUI item 10 or alternatingly change the transparency and luminance of the GUI item 10. A method of changing the transparency of the GUI item 10 is the same as/similar to the method of changing the transparency of the focus indicator 20, and redundant or duplicative description may be omitted.

For example, while the second UI feedback 1111 is provided, the size of the GUI item 10 may be alternatingly changed in order of a first UI 1110 in which the size of the GUI item 10 is a first size, followed by a second UI 1120 in which the size of the GUI item 10 is a second size, followed by the first UI 1110, followed by the second UI 1120, and so on.

Figure 12:
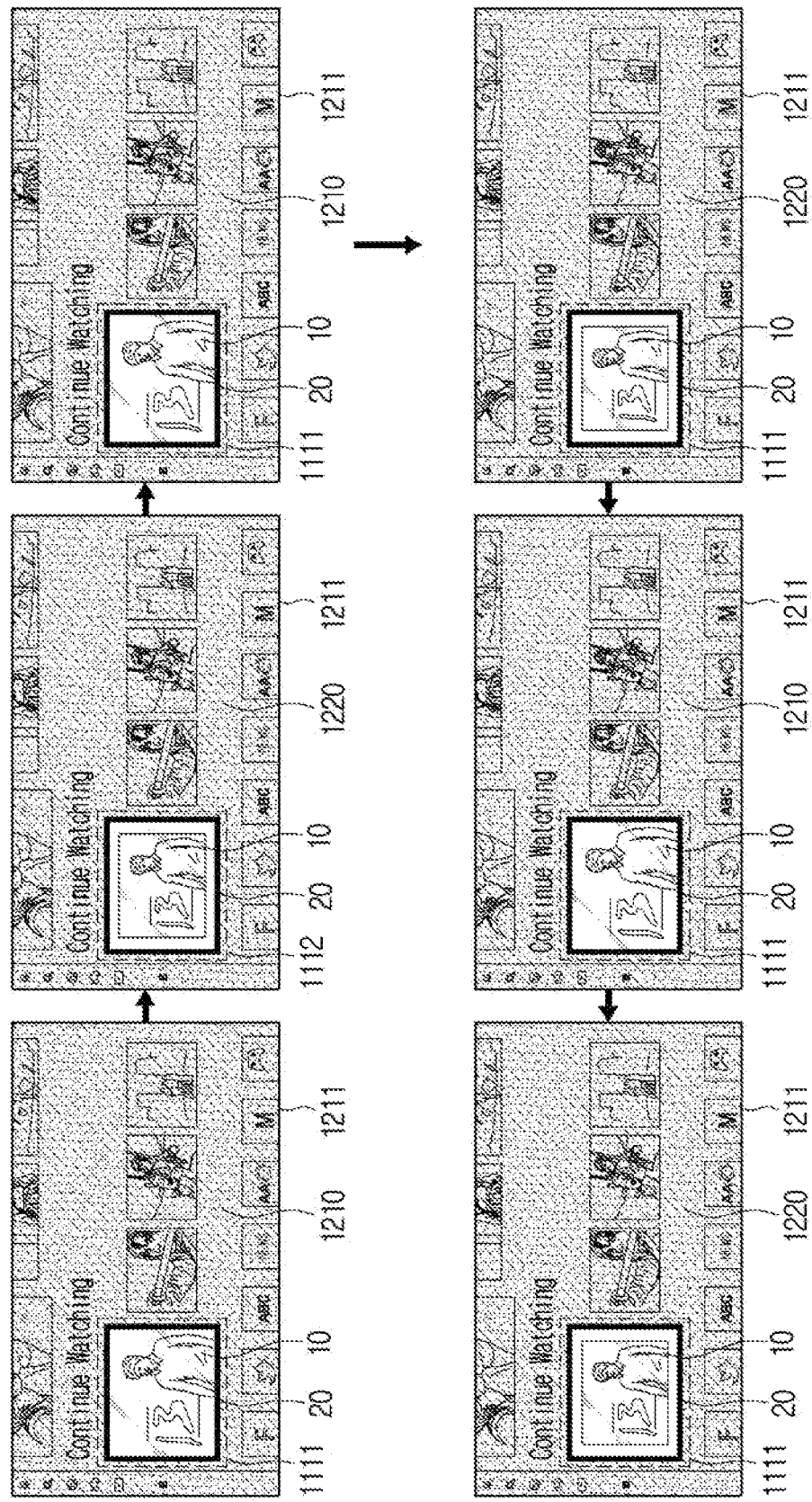
FIG. 12 is a view for explaining an example where first, second, and third UI feedbacks are provided while overlapping one another according to one or more embodiments.

FIG. 12 is a view for explaining an example where the first, second, and third UI feedbacks are provided while overlapping one another according to one or more embodiments.

According to one or more embodiments, the processor 130 may overlap and provide the first UI feedback 1000, the second UI feedback 1111, and a third UI feedback 1211 based on the user input to the UI screen being not received for greater than or equal to the third critical period of time, which may be more than the second critical period of time.

As described above with reference to FIG. 9, the third UI feedback 1211 may be the feedback reducing the luminance of the remaining region other than the region including the GUI item 10 and the region on which the focus indicator 20 is positioned.

For example, while the second UI feedback 1111 and the third UI feedback 1211 are provided, the size of the GUI item 10 may be alternatingly changed in order of a first UI 1210 in which the size of the GUI item 10 is a first size, followed by a second UI 1220 in which the size of the GUI item 10 is a second size, followed by the first UI 1210, followed by the second UI 1220, and so on.

Figure 13:
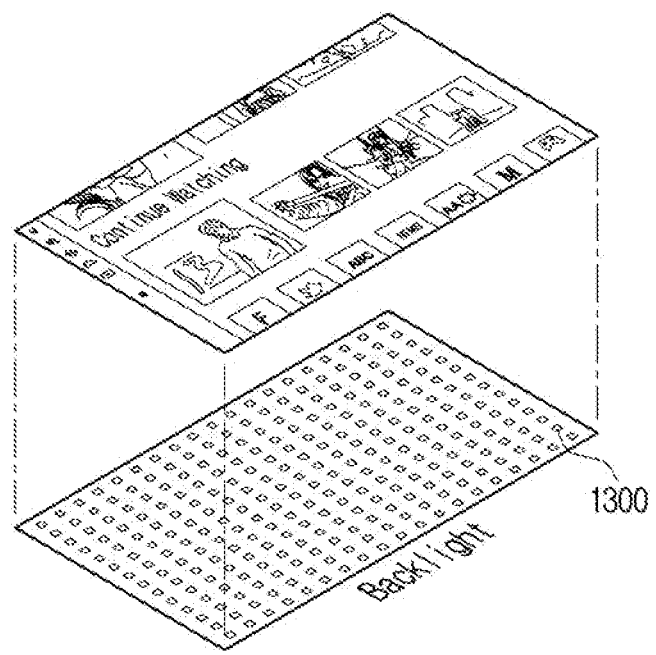
FIG. 13 is a view for explaining a third UI feedback-providing method according to one or more embodiments.
Figure 13:
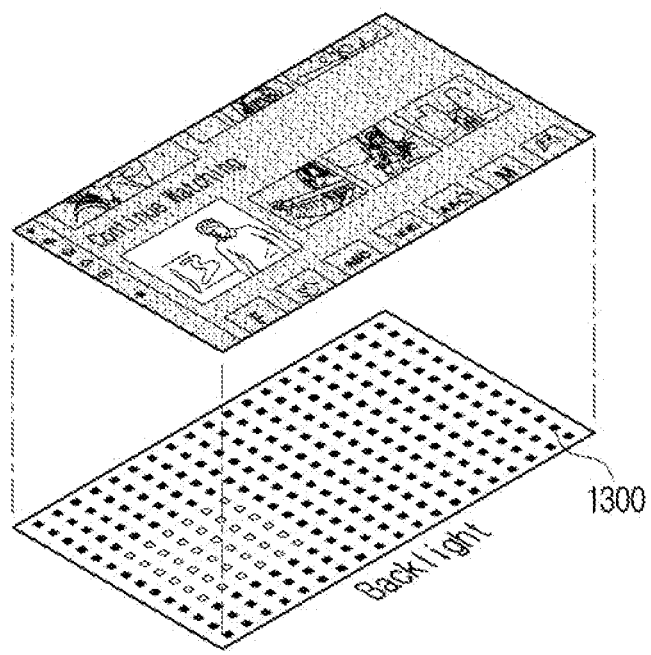

FIG. 13 is a view for explaining a third UI feedback-providing method according to one or more embodiments.

According to one or more embodiments, the display 110 may include a backlight such as an OLED or an LCD. Here, the processor 130 may provide the third UI feedback through local dimming which individually controls backlight brightness for each region. In this case, power consumption may be reduced while providing the third UI feedback.

For example, the processor 130 may determine that the UI screen includes the GUI item 10, the region where the focus indicator 20 is provided, a first region including a region where the second UI feedback is provided, and a second region including a remaining region. The processor 130 may identify at least one first backlight block corresponding to the first region and at least one second backlight block corresponding to the second region, and individually control each of the plurality of backlight blocks by acquiring a current dimming value corresponding to the first backlight block and a current dimming value corresponding to the second backlight block. For example, the processor 130 may control the brightness of light sources of a backlight unit 1300 by using pulse width modulation (PWM) with a variable duty ratio, or control the brightness of the light sources included in the backlight unit 1300 by varying the intensity of a current. Here, the pulse width modulation signal (PWM) may control the turn-on and turn-off ratios of the light sources, and its duty ratio (%) may be determined based on a dimming value input from the processor 130.

However, the display may have no backlight, and in this case, the processor 130 may provide the third UI feedback by adjusting a pixel value of a pixel.

Figure 14:
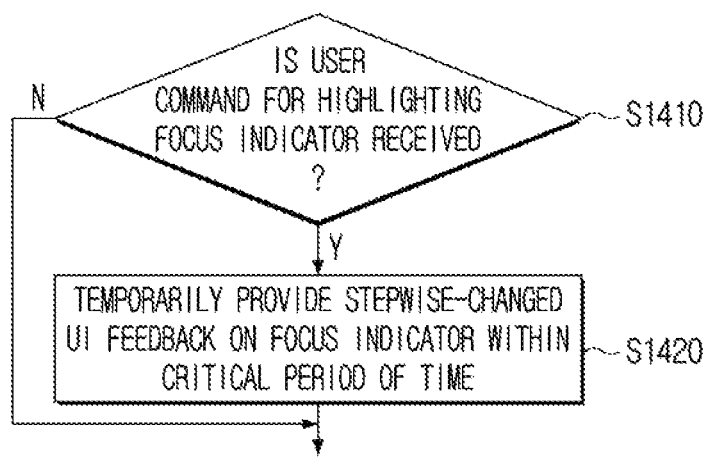
FIGS. 14 and 15 are views for explaining a maximum focus highlighting effect-providing method according to one or more embodiments.
Figure 15:
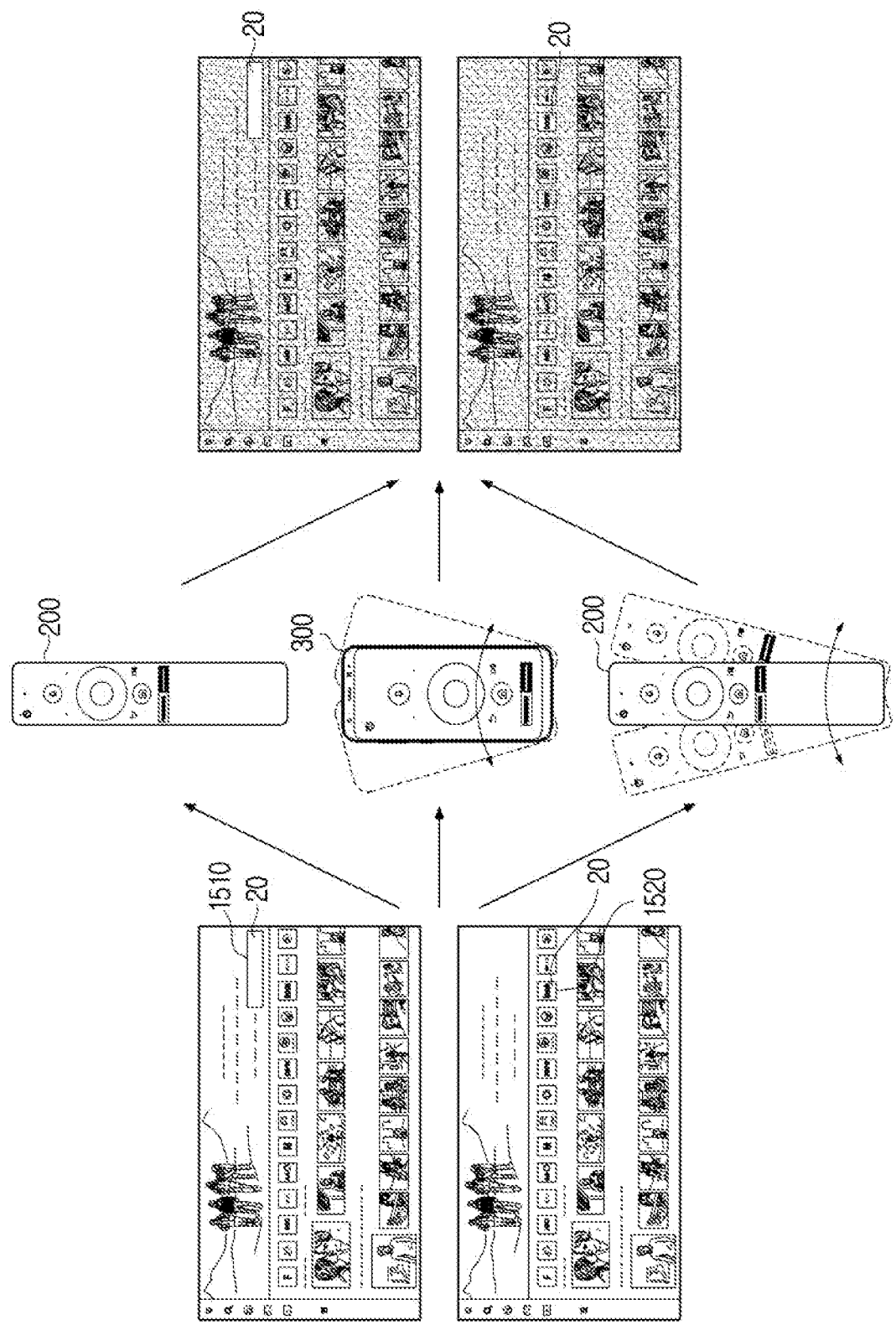

FIGS. 14 and 15 are views for explaining a maximum focus highlighting effect-providing method according to one or more embodiments.

According to an embodiment shown in FIG. 14, at operation S1410 the processor 130 may determine whether a user command for highlighting the focus indicator is received. Based on determining that the user command for highlighting the focus indicator is received (Y at operation S1410), the processor 130 may control the display 110 to temporarily provide the stepwise-changed UI feedback on the focus indicator within a critical period of time at operation S1420. For example, the stepwise focus highlighting effect described above may be temporarily provided in case that the user loses the focus and wants to find a focus position.

For example, as shown in FIG. 15, the focus indicator 20 may be positioned on a GUI item 1510 or GUI item 1520 that is not easily visible to the user. For example, a color of the focus indicator 20 and a color of the GUI item 1510 or the GUI item 1520 may be similar to each other. In this case, the user may not easily identify the focus position. Here, the processor 130 may temporarily provide the stepwise focus highlighting effect described above in case of recognizing a press operation of a button mapped to the user's focus finding (for example, a press operation of the playback button three times), a predetermined gesture (for example, quick shaking) from the remote control device 200 or a smart phone 300, which may perform the remote control function, or the like. In this case, the remote control device 200 or the smart phone 300, capable of performing the remote control function, may include a sensor (e.g., gyro sensor or acceleration sensor) for recognizing the predetermined gesture.

Figure 16:
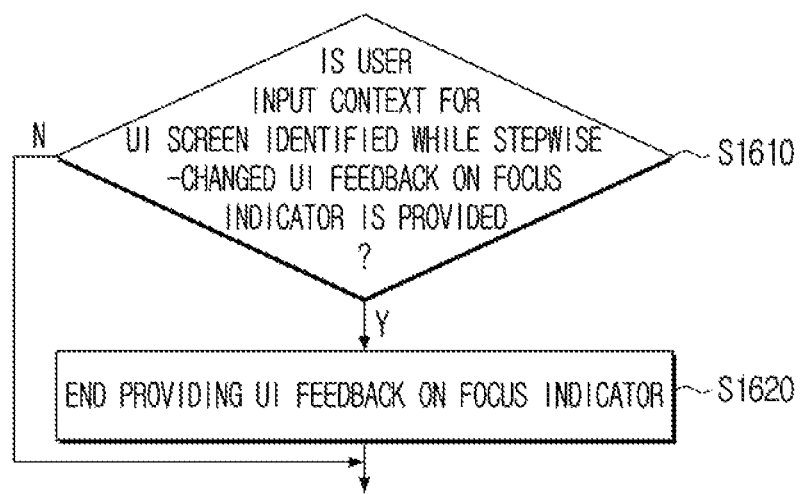
FIGS. 16 and 17 are views for explaining a focus highlighting effect-releasing method according to one or more embodiments.
Figure 17:
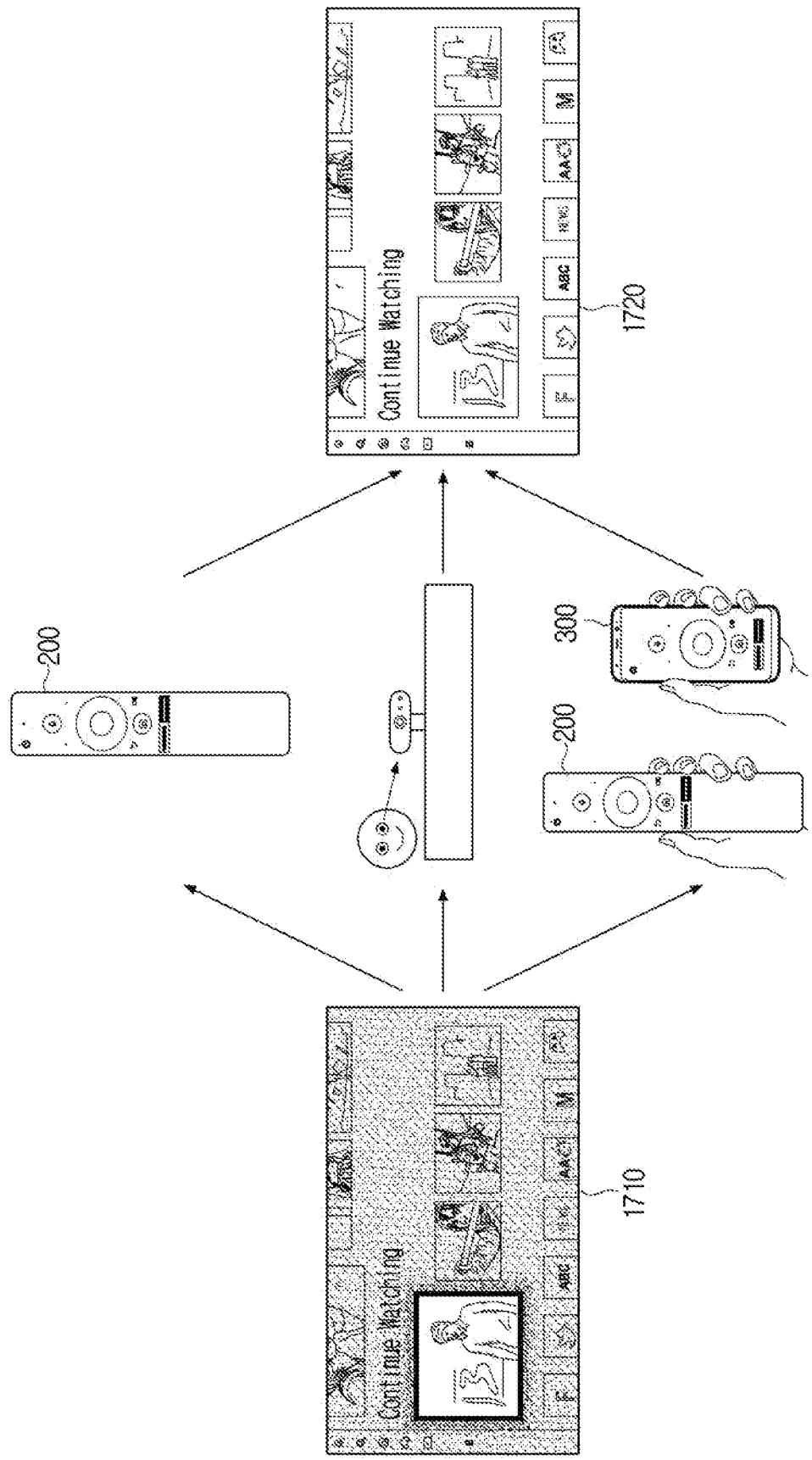

FIGS. 16 and 17 are views for explaining a focus highlighting effect-releasing method according to one or more embodiments.

According to an embodiment shown in FIG. 16, at operation S1610 the processor 130 may determine whether a user input context corresponding to the UI screen is identified while providing the stepwise-changed UI feedback on the focus indicator. Based on determining that a user input context for the UI screen is determined (Y at operation S1610), the processor 130 may control the display 110 not to provide the UI feedback on the focus indicator at operation S1620. For example, the processor 130 may provide a smooth UX experience by naturally releasing the focus highlighting effect based on identifying a context in which the user returns to a situation of manipulating the UI screen instead of the focus infocator.

For example, as shown in FIG. 17, the processor 130 may recognize a press operation of any button (except for the power button) on the remote control device 200 or a predetermined gesture (e.g., lifting) from the remote control device 200 or the smart phone 300, which may perform the remote control function, while providing the stepwise-changed second UI feedback on the focus indicator as shown for example in UI 1710. Here, the processor 130 may release the focus highlighting effect, as shown for example in UI 1720, in case that the camera 170 recognizes the user's face and gaze (for example, in case that a gaze tracking function is triggered). In this case, the remote control device 200 or the smart phone 300, capable of performing the remote control function, may include the sensor (e.g., gyro sensor or acceleration sensor) for recognizing the predetermined gesture.

According to the various embodiments described above, it is possible to minimize a recovery delay due to the user's loss of focus by increasing the visual intensity of the highlighting effect based on an increase in non-operation time on the UI screen. In addition, according to the various embodiments of the disclosure, it is possible to provide an entry point such as the user manually accessing the highlighting effect to find the focus or the user naturally exiting in case of returning to the manipulation to thus allow the focus highlighting effect function to naturally work in accordance with the user context, thereby improving user convenience.

The methods according to the various embodiments of the disclosure described above may be implemented in the form of an application which may be installed on a conventional electronic apparatus. Alternatively, the methods according to the various embodiments of the disclosure described above may be performed using a deep learning-based artificial neural network (or deep artificial neural network), that is, a learning network model.

In addition, the methods according to the various embodiments of the disclosure described above may be implemented only by software upgrade or hardware upgrade of the conventional electronic apparatus.

In addition, the various embodiments of the disclosure described above may be performed through an embedded server positioned in the electronic apparatus, or the external server positioned of the electronic apparatus.

According to one or more embodiments of the disclosure, the various embodiments described above may be implemented in software including an instruction stored in a machine-readable storage medium (for example, a computer-readable storage medium). The machine may be a device that invokes the stored instruction from a storage medium, may be operated based on the invoked instruction, and may include the electronic apparatus (e.g., electronic apparatus A) according to the disclosed embodiments. In case that the instruction is executed by the processor, the processor may directly perform a function corresponding to the instruction, or other components may perform the function corresponding to the instruction under a control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to one or more embodiments of the disclosure, the methods according to the various embodiments described above may be included and provided in a computer program product. The computer program product may be traded as a product between a seller and a purchaser. The computer program product may be distributed in a form of the machine-readable storage medium (for example, a compact disc read only memory (CD-ROM)), or may be distributed online through an application store (for example, PlayStore™). In case of the online distribution, at least a part of the computer program product may be at least temporarily stored or temporarily provided in a storage medium such as a memory of a server of a manufacturer, a server of an application store or a relay server.

In addition, each component (e.g., module or program) in the various embodiments described above may include a single entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although certain example embodiments of the disclosure are shown and described hereinabove, the disclosure is not limited to the above-mentioned specific embodiments, and may be variously modified by those skilled in the art to which the disclosure pertains without departing from the scope and spirit of the disclosure as disclosed in the accompanying claims. These modifications should also be understood to fall within the scope and spirit of the disclosure.

What is claimed is:

1. An electronic apparatus comprising:
a display; and
at least one processor configured to:
control the display to display a user interface (UI) screen comprising a plurality of graphical user interface (GUI) items and a focus indicator positioned on a focused GUI item from among the plurality of GUI items;
control the display to provide a first UI feedback on the focused GUI item based on a user input to the UI screen being not identified for greater than or equal to a first predetermined time; and
control the display to additionally provide a second UI feedback on the focused GUI item as a time in which the user input is not identified continues.

2. The electronic apparatus as clamed in claim 1, wherein the at least one processor is further configured to: additionally provide the second UI feedback based on the user input to the UI screen being not identified for greater than or equal to a second predetermined time after providing the first UI feedback, and
wherein the second predetermined time is greater than the first predetermined time.

3. The electronic apparatus as clamed in claim 1, wherein the first UI feedback and the second UI feedback comprises at least one of UI feedback on the focus indicator, UI feedback on an adjacent region which is adjacent to the focused GUI item, and UI feedback on a remaining region other than a region including the focused GUI item and the adjacent region.

4. The electronic apparatus as clamed in claim 1, wherein the at least one processor is further configured to:
provide the second UI feedback on the focused GUI item while maintaining the first UI feedback based on the user input to the UI screen being not identified for greater than or equal to a second predetermined time, and
provide a third UI feedback on the focused GUI item while maintaining at least one of the first UI feedback and the second UI feedback, based on the user input to the UI screen being not identified for greater than or equal to a third predetermined time, and
wherein the second predetermined time is greater than the first predetermined time and less than the third predetermined time.

5. The electronic apparatus as claimed in claim 4, wherein the first UI feedback comprises highlighting the focus indicator,
wherein the second UI feedback comprises highlighting an adjacent region which is adjacent to the focused GUI item, and
wherein the third UI feedback comprises adjusting a luminance of a remaining region other than a region including the focused GUI item and the adjacent region.

6. The electronic apparatus as clamed in claim 4, wherein the first UI feedback comprises alternatingly changing a transparency of the focus indicator, and
wherein the third UI feedback comprises reducing a luminance of a remaining region other than a region including the GUI item and an adjacent region which is adjacent to the focused GUI item.

7. The electronic apparatus as claimed in claim 5, wherein the display comprises a display panel and a backlight configured to provide light to the display panel, and
wherein the at least one processor is further configured to adjust the luminance of the remaining region through local dimming of the backlight.

8. The electronic apparatus as claimed in claim 1, wherein the first UI feedback comprises alternatingly changing a size of the focused GUI item.

9. The electronic apparatus as clamed in claim 1, wherein the at least one processor is further configured to control the display to temporarily provide the first UI feedback and the second UI feedback on the focused GUI item within a predetermined time based on receiving a user command for highlighting the focus indicator.

10. The electronic apparatus as clamed in claim 1, wherein the at least one processor is further configured to control the display to not provide the first UI feedback and the second UI feedback on the focused GUI item based on identifying a user input context corresponding to the UI screen while providing the first UI feedback and the second UI feedback on the focused GUI item.

11. A method of providing a user interface (UI) for an electronic apparatus, the method comprising:
displaying a user interface (UI) screen including a plurality of graphical user interface (GUI) items and a focus indicator positioned on a focused GUI item from among the plurality of GUI items;
providing a first UI feedback on the focused GUI item based on a user input to the UI screen being not identified for greater than or equal to a first predetermined time; and
additionally provide a second UI feedback on the focused GUI item as a time in which the user input is not identified continues.

12. The method as clamed in claim 11, wherein the additionally providing the second UI feedback comprises additionally providing the second UI feedback based on the user input to the UI screen being not identified for greater than or equal to a second predetermined time, and
wherein the second predetermined time is greater than the first predetermined time.

13. The method as clamed in claim 12, wherein the first UI feedback and the second UI feedback comprise at least one of UI feedback on the focus indicator, UI feedback on an adjacent region which is adjacent to the focused GUI item, and UI feedback on a remaining region other than a region including the GUI item on which the focus indicator is positioned and the adjacent region.

14. The method as clamed in claim 12, wherein the additionally providing the second UI feedback comprising:
providing the second UI feedback on the focused GUI item while maintaining the first UI feedback based on the user input to the UI screen being not identified for greater than or equal to the second predetermined time, wherein the method further comprises:
providing a third UI feedback on the focused GUI item while maintaining at least one of the first UI feedback and the second UI feedback, based on the user input to the UI screen being not identified for greater than or equal to a third predetermined time, and
wherein the second predetermined time is greater than the first predetermined time and less than the third predetermined time.

15. The method as clamed in claim 14, wherein the first UI feedback comprises highlighting the focus indicator,
wherein the second UI feedback comprises highlighting an adjacent region which is adjacent to the focused GUI item, and
wherein the third UI feedback comprises adjusting a luminance of a remaining region other than a region including the focused GUI item and the adjacent region.

16. The method as clamed in claim 14, wherein the first UI feedback comprises alternatingly changing a transparency of the focus indicator, and
wherein the third UI feedback comprises reducing a luminance of a remaining region other than a region including the focused GUI item and an adjacent region which is adjacent to the focused GUI item.

17. The method as clamed in claim 11, wherein the first UI feedback comprises alternatingly changing a size of the focused GUI item.

18. The method as clamed in claim 11, further comprising:
temporarily providing the first UI feedback and the second UI feedback on the focused GUI item within a predetermined time based on receiving a user command for highlighting the focused GUI item.

19. A non-transitory computer-readable medium storing instructions which, when executed by at least one processor, cause the at least one processor to:
display a user interface (UI) screen comprising a plurality of graphical user interface (GUI) items and a focus indicator positioned on a focused GUI item from among the plurality of GUI items;
provide a first UI feedback on the focused GUI item based on a user input to the UI screen being not identified for greater than or equal to a first predetermined time; and
additionally provide a second UI feedback on the focused GUI item as a time in which the user input is not identified continues.

20. The electronic apparatus as clamed in claim 8, wherein the second UI feedback comprises providing a highlighting effect to the focused GUI item.

* * * * *